United States Patent
Stoffel

(10) Patent No.: US 6,521,030 B1
(45) Date of Patent: Feb. 18, 2003

(54) INKJET INK SETS WITH HIGH LIGTHFASTNESS DYE

(75) Inventor: John L Stoffel, San Diego, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 103 days.

(21) Appl. No.: 09/599,352

(22) Filed: Jun. 20, 2000

(51) Int. Cl.$^7$ .............................................. C09D 11/02
(52) U.S. Cl. ................. 106/31.27; 106/31.43; 106/31.47; 106/31.48; 106/31.5; 106/31.51; 106/31.52
(58) Field of Search ............ 106/31.27, 31.43, 106/31.47, 31.48, 31.5, 31.51, 31.52

(56) References Cited

U.S. PATENT DOCUMENTS

| | | | |
|---|---|---|---|
| 5,725,641 A | 3/1998 | MacLeod | 106/31.5 |
| 5,833,743 A | * 11/1998 | Elwakil | 106/31.27 |
| 5,858,075 A | 1/1999 | Deardurff et al. | 106/31.27 |
| 5,888,284 A | 3/1999 | Engel | |
| 5,980,622 A | 11/1999 | Byers | 106/31.48 |
| 5,997,622 A | 12/1999 | Weber et al. | 106/31.48 |
| 6,001,161 A | 12/1999 | Evans et al. | 106/31.48 |
| 6,454,844 B1 * | 9/2002 | Kanaya | 106/31.48 |

FOREIGN PATENT DOCUMENTS

| | | |
|---|---|---|
| EP | 0662499 A2 | 12/1994 |
| EP | 0936259 A1 | 2/1999 |
| JP | 02/127482 * | 5/1990 |

OTHER PUBLICATIONS

WEST abstract of JP02/127482, 5/90.*
Patent Abstracts of Japan for 02/127482, 5/90.*
Patent Abstracts of Japan for 02/127482, 5/90.*
Structure of the dye Direct Red 81 from Chemical Abstracts, 2 pages, no date available.*
Proceedings RMS; "Ink Jet Printing: Joining The Jet Set"; by: Peter Gregory; vol. 36/3; Sep. 2001; pp: 232–238.
www/kcst.org/archive2/reports/2000–2001/program0201.ppt; Isoindolinones & Isoindolines; SunChemical; one page, no month available.
http://www.echinachem.com/Category/showChemical.asp!Cid= 94; eChinaChem; dated Apr. 29, 2002; 4 pages.
http://www.Iona.com/dyes.htm; LONA Pigments and Dyes; Products: Phthalocyanine Dyes; Dated May 1, 2002; one page.
E.N. Abrahart, "Dyes and their Intermediates" pp 2–123, no date available.
P.F. Gordon et al. 1984 Clinical Reports on Applied Chemistry vol. 7 "Developments in the Chemistry and Technology of Organic Dyes" pp 67–109, 1984, no Month avaiable.
Recent Advances in the chemistry of Colouring Matters, Special Pub No. 4, London: The Chemical Society, 1956, no Month available.

* cited by examiner

Primary Examiner—Helen Klemanski

(57) ABSTRACT

A set of inkjet inks with at least one of light magenta ink having high lightfastness magenta dye, a light cyan ink having high lightfastness cyan dye, light yellow ink having high lightfastness yellow dye and light black having high lightfastness black dye.

80 Claims, No Drawings

INKJET INK SETS WITH HIGH LIGTHFASTNESS DYE

FIELD OF INVENTION

The present invention generally relates to inkjet printing, and in particular to a specific ink set with high lightfastness dye for improving inkjet image quality.

BACKGROUND OF INVENTION

The use of inkjet printing systems has grown dramatically in recent years. This growth may be attributed to substantial improvements in print resolution and overall print quality coupled with appreciable reduction in cost. Today's inkjet printers offer acceptable print quality for many commercial, business, and household applications at costs fully an order of magnitude lower than comparable products available just a few years ago. Notwithstanding their recent success, intensive research and development efforts continue toward improving inkjet print quality. In general, inkjet print quality still falls short of that produced by more expensive technologies such as photography and offset or gravure printing. A surge in interest in inkjet imaging (e.g., the rendition of pictures) has resulted in the need to produce near photographic quality printed images at a reasonable cost. The challenge remains to further improve the image quality and lightfastness of inkjet printed images, especially images containing skin tones, without increasing their cost.

Color inkjet printers typically use three inks of differing hues: magenta, yellow, and cyan, and optionally black. The particular set of colorants, e.g., dyes, used to make the inks is called a "primary dye set." A spectrum of colors, e.g., secondary colors, can be generated using different combinations of the primary dye set. In printing processes such as lithography, dye transfer, and some types of thermal transfer, it is possible to vary spot size so that less is demanded of the primary colored inks when producing a good secondary. When the colored inks are used in a binary printing device, that is, one in which a dot of color is either present or absent, e.g., a thermal inkjet printer, the ability of the primaries to give recognizable secondaries is even more important.

If such an ink is to be used in an inkjet printing device, characteristics such as crusting, long-term stability, and materials compatibility must also be addressed. If the ink is to be used in a thermal inkjet printer, the further constraint of being thermally stable (kogation-resistant) is added.

In general, a successful ink set for color inkjet printing must be compatible with the inkjet pen and printing system. Some of the required properties for the inkjet ink include: good crusting resistance, good stability, the proper viscosity, the proper surface tension, little color-to-color bleed, rapid dry time, no negative reaction with the vehicle, high solubility of the dyes in the vehicle, consumer safety, low strike through, high color saturation, and good dot gain.

Furthermore, the colored characteristics of the colorants play an important role in the quality of the printed inkjet image. Color inkjet inks have been designed and tailored for printing business graphics such as depiction of information in the form of "pie-charts" and "bar-charts" on plain paper. These applications require that inkjet use bright, vivid, high chroma colorants that, in general, are not lightfast. Generally, these dyes, although suitable for business graphics, do not provide a "true" photographic lightfastness especially in the lower portion of the tone scales. Chroma describes how much color or how vivid an object is. In the CIE L*a*b* system, the lightness or L* is a good measure of chroma with a low L* value being very dark.

One attribute that is particularly important in imaging (i.e., color rendition of pictures) is "grain". Grain describes how visible the dots are to the viewer. If large, dark drops are used, the dots become very visible and image quality is degraded. One technique to reduce grain is to use smaller drop weight to produce nearly invisible drops. The downsides to this technique are more difficult and more costly manufacturing processes due to the requirement for smaller orifice holes and resistors and more difficult reliability challenges due to the smaller holes. Another technique is to use additional "light" inks such as a light magenta or cyan at colorant loadings 5–25% of the normal or dark ink. This technique allows the use of larger, low colorant load drops. These "light" drops are less visible due to the presence of less colorant. One downside to this approach is that these "light" inks fade much faster on media than the dark inks. This fade often occurs in critical areas such as the skin tone of a human being. Thus, there is a need for more lightfast colorants to be used in these light inks.

Investigations continue into developing ink formulations which have improved properties and which do not improve one property at the expense of the others. Thus, the challenge remains to further improve the image quality and lightfastness of the inkjet prints without sacrificing pen performance and reliability.

SUMMARY OF THE INVENTION

In one embodiment, the present invention relates to a set of inkjet inks for inkjet printing, comprising: a light magenta ink comprising a high lightfastness magenta dye.

In another embodiment, the present invention relates to a set of inkjet inks for inkjet printing, comprising: a light cyan ink comprising a high lightfastness cyan dye.

In yet another embodiment, the present invention relates to a set of inkjet inks for inkjet printing, comprising: a light yellow ink comprising a high lightfastness yellow dye.

In still another embodiment, the present invention relates to a set of inkjet inks for inkjet printing, comprising: a light black ink comprising a high lightfastness black dye.

In another embodiment, the present invention relates to a method for inkjet printing, the method comprising the step of ejecting ink from an inkjet, the ink comprising a light magenta ink, the light magenta ink comprising a high lightfastness magenta dye.

In yet another embodiment, the present invention relates to a method for inkjet printing, the method comprising the step of ejecting ink from an inkjet, the ink comprising a light cyan ink, the light cyan ink comprising a high lightfastness cyan dye.

In still another embodiment, the present invention relates to a method for inkjet printing, the method comprising the step of ejecting ink from an inkjet, the ink comprising a light yellow ink, the light yellow ink comprising a high lightfastness yellow dye.

In another embodiment, the present invention relates to a method for inkjet printing, the method comprising the step of ejecting ink from an inkjet, the ink comprising a light black ink, the light black ink comprising a high lightfastness black dye.

DETAILED DESCRIPTION OF THE INVENTION

The present invention described herein is directed to inkjet inks for printing inkjet images using commercially available inkjet printers such as, for example but not limited to, HP DeskJet® printers, manufactured by Hewlett-Packard Company, of Palo Alto, Calif. The inks enable production of near photographic images having excellent waterfastness and reduced dry time, on a range of print media, in particular, for example but not limited to, plain white, 8½"×11", 20 lb. weight, printer paper conventionally used for office and home computers. As a non-limiting example, a specialty paper such as HP Premium Plus Photo printer paper or its equivalent may be used.

In the present invention, the inventors have shown that it is possible to achieve good lightfastness in a light ink when a high lightfast dye is used in the light ink. That is, using more than one inkjet reservoir filled for each ink color, the light and the dark pen of a given color potentially having each pen with a different dye; one dye in the light pen, for example, having higher lightfastness and one dye in the dark pen having higher chroma. Thus, an important aspect of the present invention is that, for a certain hue, even if a high chroma dye with mediocre or poor lightfastness is used in the dark pen, a completely different dye, having much more robustness in terms of lightfastness, may be used in the light pen. Generally, this dye still can produce sufficient chroma in the light or high L* areas. This resolves the problem of "fade" that often occurs, for example, in skin tones in inkjet color printing, when dyes having poor lightfastness are used in the light pen.

In one embodiment, the present invention relates to a set of inkjet inks for inkjet printing and a method for inkjet printing, the method comprising the step of ejecting ink from an inkjet, the ink comprising a light magenta ink, the light magenta ink comprising a high lightfastness magenta dye. In a preferred embodiment, this set and method further comprise: a dark magenta ink comprising a high chroma magenta dye. In a more preferred embodiment of this set and method, the high lightfastness magenta dye of the light magenta ink is a different dye than the high chroma magenta dye of the dark magenta ink. In a yet more preferred embodiment of this set and method, the high lightfastness magenta dye has a chroma at most 80% of the high chroma magenta dye chroma.

In another preferred embodiment, the high lightfastness magenta dye has a solubility of less than 10% in an aqueous vehicle.

In another preferred embodiment of the above-described set and method, the set of inkjet inks further comprises: a cyan ink comprising a cyan dye; and a yellow ink comprising a yellow dye.

In a more preferred embodiment of this set and method, each of the magenta, cyan and yellow inks comprises from about 0.1 to about 5 wt % dye; and in a yet more preferred embodiment, each of the magenta, cyan and yellow inks comprises from about 2.5 to about 5 wt % dye.

In yet another preferred embodiment of the above-described set and method, the high lightfastness magenta dye is selected from the group consisting of anthraquinones, azo dyes, and perylenes. In a more preferred embodiment of this set and method, the anthraquinones have structures selected from the group consisting of

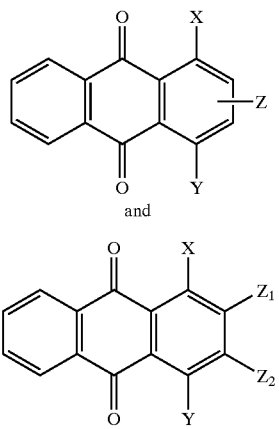

and wherein X, Y, Z, $Z_1$ and $Z_2$ are selected from the group consisting of hydrogen, —OH, —$NH_2$, —NHPhenyl, —$NHR_1$, —OPhenyl, —$OR_1$, and —$NR_1R_2$; wherein $R_1$ and $R_2$ are selected from the group consisting of hydrogen, alkyl, aryl, substituted alkyl, and substituted aryl.

In another more preferred embodiment of this set and method, the azo dyes have a structure

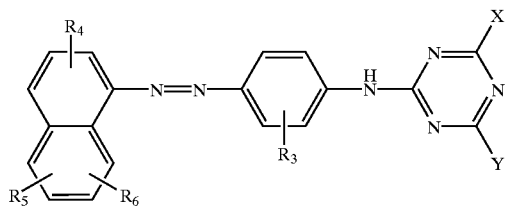

wherein X, Y, $R_3$, $R_4$, $R_5$ and $R_6$ are selected from the group consisting of —$OR_1$, —$SO_2R_1$, —$NR_1R_2$, —$SO_3^-$, and halogen; and wherein $R_1$ and $R_2$ are selected from hydrogen, alkyl, aryl, substituted alkyl, and substituted aryl. In another more preferred embodiment of this set and method, the azo dyes have a structure

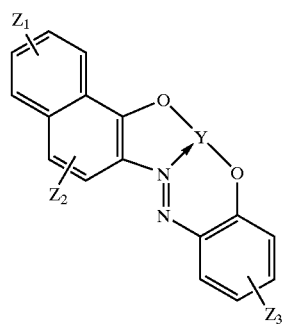

wherein $Z_1$, $Z_2$, and $Z_3$ are selected from the group consisting of —$OR_1$, —$SO_2R_1$, —$NR_1R_2$, —$SO_3^-$, and halogen, and wherein $R_1$ and $R_2$ are selected from the group consisting of hydrogen, alkyl, aryl, substituted alkyl, and substituted aryl;

and wherein Y is a polyvalent transition metal selected from the group consisting of iron, nickel, copper, cobalt, zinc, and chromium.

In still an additional preferred embodiment of the above-described set and method, the azo dye is Reactive Red 23 having a structure

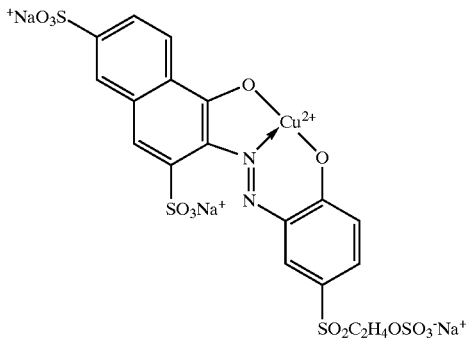

In yet another more preferred embodiment of this set and method, the azo dyes are 2-(ortho-hydroxy-phenylazo)-1-pyrazolones, having a structure selected from the group consisting of

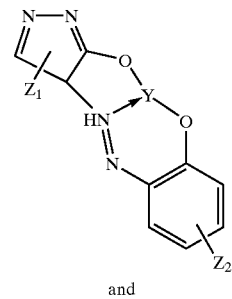

and

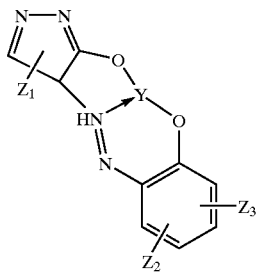

wherein Y may be a polyvalent transition metal selected from the group consisting of iron, nickel, copper, cobalt, zinc, and chromium; and $Z_1$, $Z_2$, and $Z_3$ may be selected from the group consisting of $-OR_1$, $-SO_2R_1$, $-NR_1R_2$, $-SO_3^-$, and halogen, with $R_1$ and $R_2$ selected from the group consisting of hydrogen, alkyl, aryl, substituted alkyl, and substituted aryl.

In yet another more preferred embodiment of this set and method, the perylenes have a structure

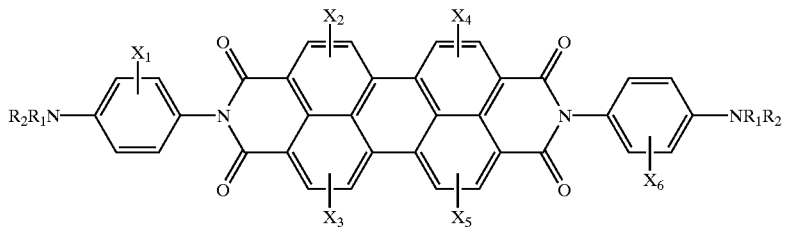

wherein $R_1$ and $R_2$ are selected from the group consisting of hydrogen, alkyl, aryl, substituted aryl and substituted alkyl;

and wherein $X_1$, $X_2$, $X_3$, $X_4$, $X_5$ and $X_6$ are selected from the group consisting of hydrogen and sulfonate.

In an additional preferred embodiment of the above-described set and method, the high lightfastness magenta dye is a 4-hydroxy-3-(2'-pyridylazo)-1-(sulfo substituted) naphthalene magenta dye ligand; and in a more preferred embodiment, the dye-ligand is selected from the group consisting of 4-hydroxy-3-(2'-pyridylazo)-1-naphthalenesulfonic acid; 4-hydroxy-3-(2'-pyridylazo)-1-naphthalenesulfonamide; N-substituted-4-hydroxy-3-(2'-pyridylazo)-1-naphthalenesulfonamide; N,N'-bis (substituted)-4-hydroxy-3-(2'-pyridylazo-1-naphthalenesulfonamide; and mixtures thereof.

In a further preferred embodiment of the above-described set and method, the high lightfastness magenta dye is a dye ligand coordinated to a polyvalent transition metal selected from the group consisting of iron, nickel, copper, cobalt, zinc, and chromium.

In yet an additional preferred embodiment of the above-described set and method, the high lightfastness magenta dye is an 8-heterocyclylazo-5-hydroxyquinoline having a structure

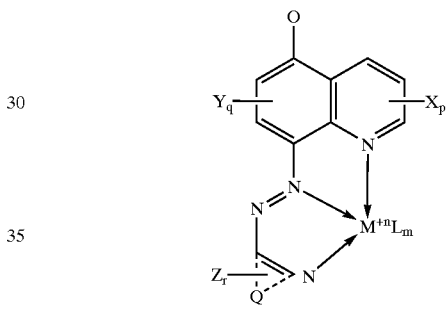

wherein:

M represents a polyvalent transition metal ion selected from the group consisting of iron, nickel, copper, cobalt, zinc, and chromium;

each L independently represents a neutral or anionic ligand;

each X, Y and Z independently represents a substituted or unsubstituted alkyl group of 1–6 carbon atoms, a substituted or unsubstituted aryl group of 6–10 carbon atoms, a substituted or unsubstituted hetaryl group of 5–10 atoms, a halogen, a cyano group, a nitro group, a substituted or unsubstituted alkoxycarbonyl group of 1–6 carbon atoms, a substituted or unsubstituted alkoxy group of 1–6 carbon atoms, a hydroxy group, a polyoxyalkylene group of 2–20 alkylene oxide residues, a carboxy group or a salt thereof, a sulfo group or a salt thereof, a phospho group or a salt thereof, a carbamoyl group, a substituted or unsubstituted alkyl-, aralkyl-, aryl-, diaryl- or dialkyl-carbamoyl group of 1–20 carbon atoms, a sulfamoyl group, a substituted or unsubstituted alkyl-, aralkyl-, aryl-, diaryl- or dialkyl-amino group of 1–20 carbon atoms or a quaternary ammonium or phosphonium group;

Q represents the atoms necessary to complete a 5- or 6-membered heterocyclic ring;

n represents 2 or 3;

m represents an integer from 1–3;

each p and r independently represents an integer from 0–3;

q represents 0, 1 or 2;

two or more of L may be joined together to form a bi- or tridentate ligand which may optionally comprise another polydentate molecule of the same or different structure as shown above;

one or more of L may be combined with X and/or Z;

one or more of X, Y and Z, together with the carbon to which they are attached, may independently represent a ring nitrogen; and any two of X, Y or Z may be joined together to form a 5–7 membered saturated or unsaturated ring.

In another embodiment, the present invention relates to a set of inkjet inks for inkjet printing and a method for inkjet printing, the method comprising the step of ejecting ink from an inkjet, the ink comprising a light cyan ink, the light cyan ink comprising a high lightfastness cyan dye. In a preferred embodiment, this set and method further comprises: a dark cyan ink comprising a high chroma cyan dye.

In another preferred embodiment, the high lightfastness cyan dye has a solubility of less than 10% in an aqueous vehicle.

In a more preferred embodiment of this set and method, the high lightfastness cyan dye of the light cyan ink is a different dye than the high chroma cyan dye of the dark cyan ink. In a yet more preferred embodiment of this set and method, the high lightfastness cyan dye has a chroma at most 80% of the high chroma cyan dye chroma.

In another preferred embodiment of the above-described set and method, the set of inkjet inks further comprises: a magenta ink comprising a magenta dye; and a yellow ink comprising a yellow dye.

In a more preferred embodiment of this set and method, each of the magenta, cyan and yellow inks comprises from about 0.1 to about 5 wt % dye; and in a yet more preferred embodiment, each of the magenta, cyan and yellow inks comprises from about 2.5 to about 5 wt % dye.

In yet another preferred embodiment of the above-described set and method, the high lightfastness cyan dye is selected from the group consisting of Direct Blue 199, Direct Blue 86, Acid Blue 45, Acid Blue 138, Acid Blue 251, copper phthalocyanines, nickel phthalocyanines, anthraquinones, disazothiophenes and mixtures thereof.

In a more preferred embodiment of this set and method, the anthraquinones are selected from the group consisting of

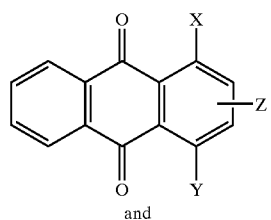

and

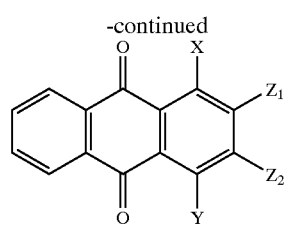

wherein X, Y, Z, $Z_1$ and $Z_2$ are selected from the group consisting of —OH, —NH$_2$, —NHPhenyl, —NHR$_1$, —OPhenyl, —OR$_1$,

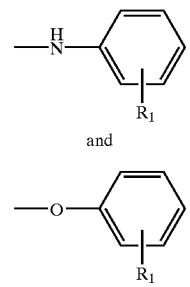

and wherein $R_1$ is an alkyl group having from 1 to 20 carbons.

In yet another more preferred embodiment of this set and method, the disazothiophenes have a structure

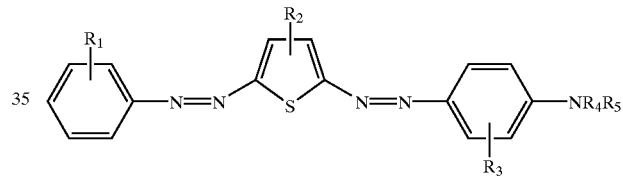

wherein $R_1$, $R_2$, and $R_3$ are selected from the group consisting of —OR, —SO$_2$R$_1$, —NR$_4$R$_5$, —SO$_3^-$ and halogen; and wherein $R_4$ and $R_5$ are selected from the group consisting of hydrogen, alkyl, aryl, substituted alkyl and substituted aryl.

In yet another more preferred embodiment, the high hightfastness cyan dye is a dye ligand coordinated to a polyvalent transitional metal selected from the group consisting of iron, nickel, copper, cobalt, zinc and chromium.

In another embodiment, the present invention relates to a set of inkjet inks for inkjet printing, and a method for inkjet printing, the method comprising the step of ejecting ink from an inkjet, the ink comprising a light yellow ink, the light yellow ink comprising a high lightfastness yellow dye. In a preferred embodiment, this set further comprises: a dark yellow ink comprising a high chroma yellow dye.

In another embodiment, the high lightfastness yellow dye has a solubility of less than 10% in an aqueous vehicle.

In a more preferred embodiment of this set and method, the high lightfastness yellow dye of the light yellow ink is a different dye than the high chroma yellow dye of the dark yellow ink. In a yet more preferred embodiment of this set and method, the high lightfastness yellow dye has a chroma at most 80% of the high chroma yellow dye chroma.

In another preferred embodiment of the above-described set and method, the set of inkjet inks further comprises: a magenta ink comprising a magenta dye; and a cyan ink comprising a cyan dye.

In a more preferred embodiment of this set and method, each of the magenta, cyan and yellow inks comprises from about 0.1 to about 5 wt % dye; and in a yet more preferred embodiment, each of the magenta, cyan and yellow inks comprises from about 2.5 to about 5 wt % dye.

In another more preferred embodiment of the above-described set and method, the high lightfastness yellow dye is selected from the group consisting of Yellow 104, Direct Yellow 4, Direct Yellow 86, Direct Yellow 132, Direct Yellow 50, an azo dye, and mixtures thereof.

In yet another more preferred embodiment of the above-described set and method, the high lightfastness yellow dye is a dye ligand coordinated to a polyvalent transition metal selected from the group consisting of iron, nickel, copper, zinc, and chromium.

In another embodiment, the present invention relates to a set of inkjet inks for inkjet printing, and a method for inkjet printing, the method comprising the step of ejecting ink from an inkjet, the ink comprising a light black ink, the light black ink comprising a high lightfastness black dye. In a preferred embodiment, this set and method further comprises: a dark black ink comprising a high optical density black dye.

In another embodiment, the high lightfastness black dye has a solubility of less than 10% in an aqueous vehicle.

In a more preferred embodiment of this set and method, the high lightfastness black dye of the light black ink is a different dye than the high optical density black dye of the dark black ink. In a yet more preferred embodiment of this set and method, the high lightfastness black dye has an optical density at most 80% of the high optical density black dye.

In another preferred embodiment of the above-described set and method, the set of inkjet inks further comprises: a magenta ink comprising a magenta dye; a cyan ink comprising a cyan dye; and a yellow ink comprising a yellow dye.

In a more preferred embodiment of this set and method, each of the black, magenta, cyan and yellow inks comprises from about 0.1 to about 5 wt % dye; and in a yet more preferred embodiment, each of the black, magenta, cyan and yellow inks comprises from about 2.5 to about 5 wt % dye.

In yet another more preferred embodiment of the above-described set and method, the high lightfastness black dye is a dye ligand coordinated to a polyvalent transition metal selected from the group consisting of iron, nickel, copper, zinc, and chromium.

In another more preferred embodiment of this set and method, the high lightfastness black dye has the structure

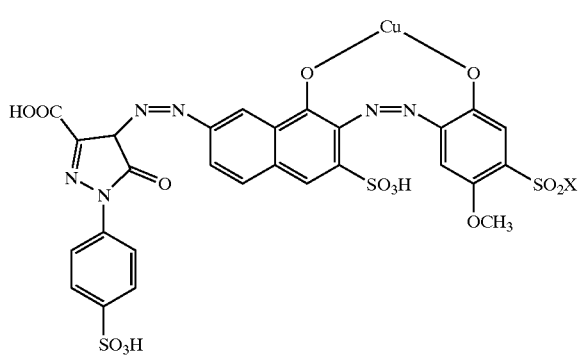

wherein X is selected from the group consisting of —CH=CH$_2$ and —CH$_2$—CH$_2$—O—H.

EXAMPLES

Example 1

Lightfastness of printed images of unpassivated Reactive Red 23 (RR23) and Magenta 377 (M377) were tested for lightfastness initially and after 7.5 months office light fade by measuring percentage Optical Density Loss. Results are given in the following table.

|      | Before fade | After fade | % loss |
| ---- | ----------- | ---------- | ------ |
| M377 | 1.76        | 0.24       | 86.3%  |
| RR23 | 1.27        | 0.80       | 37.0%  |

Example 2

Lightfastness of printed images of passivated Reactive Red 23 (pRR23), Magenta 377 (M377) and Projet Fast Magenta 2 (PJFM2) was measured by testing % Optical Density loss after accelerated indoor fade in HPUV tester, no fixer. The samples were tested at 3 month and 6 month conditions. The results are given in the following tables.

|          | light magenta | light red | light blue |
| -------- | ------------- | --------- | ---------- |
| 3 months |               |           |            |
| M377     | −6            | −4        | −41        |
| PJFM2    | −30           | −30       | −14        |
| pRR23    | −1            | −2        | −13        |
| 6 months |               |           |            |
| M377     | −7            | −7        | −45        |
| PJFM2    | −43           | −32       | −17        |
| RR23     | −4            | −3        | −19        |

Example 3

Lightfastness of images printed with inkjet inks was measured. The inkjet inks used in the printed images have, respectively, either passivated RR23 or passivated Magenta 377, as colorants. The images were printed on HP large format High Gloss Photo Paper (C6026A) using 20% as the acceptable fade limit. Results are given in the following table.

| Years with acceptable fade for light magenta ink | |
| --- | --- |
| Magenta dye | Years of lightfastness |
| M377 | 4.6 years |
| RR23 | 15 years |

Example 4

Images were printed on typical plain white printer paper with inkjet inks with colorants selected from one of three magenta dye candidates. Chroma of printed images using M377, Projet Fast M2 and RR23, respectively, was measured. Results are given in the following table. Maximum chroma should be at least 60 to produce a chromatic red on plain paper. These results show that according to this standard, RR23 does not provide acceptable performance in a dark ink on plain paper.

| Dye | Chroma when 70 > L* > 60 | Maximum Chroma |
|---|---|---|
| M377 | 41.3 | 60 |
| Projet Fast M2 | 43.5 | 68 |
| RR23 | 46.3 | 51 |

While the foregoing invention has been described in some detail for purposes of clarity and understanding, it will be clear to one skilled in the art from the reading of this disclosure that various changes in form and detail can be made without departing from the true scope of the invention.

What is claimed is:

1. A set of inkjet ink for inkjet printing, comprising a light magenta ink comprising a high lightfastness magenta dye, the ink set further comprising a dark magenta ink comprising a high chroma magenta dye, wherein the high lightfastness magenta dye is selected from the group consisting of

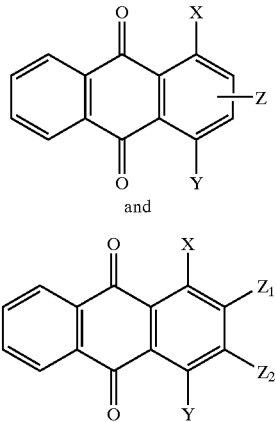

and wherein X, Y, Z, $Z_1$ and $Z_2$ are selected from the group consisting of —OH, —NH$_2$, —NHPhenyl, —NHR$_1$, —OPhenyl, —OR$_1$,

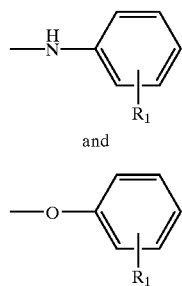

and wherein R$_1$ is an alkyl group having from 1 to 20 carbons.

2. A set of inkjet inks for inkjet printing, comprising a light magenta ink comprising a high lightfastness magenta dye, the ink set further comprising a dark magenta ink comprising a high chroma magenta dye, wherein the high lightfastness magenta dye has a structure

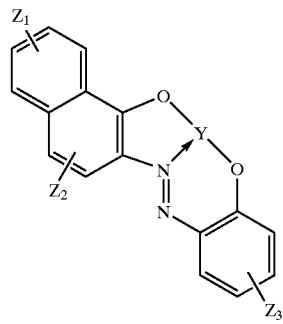

wherein $Z_1$, $Z_2$, and $Z_3$ are selected from the group consisting of —OR$_1$, —SO$_2$R$_1$, —NR$_1$R$_2$, —SO$_3^-$ and halogen, and wherein R$_1$ and R$_2$ are selected from the group consisting of hydrogen, alkyl, aryl, substituted alkyl, and substituted aryl; and wherein Y is a polyvalent transition metal selected from the group consisting of iron, nickel, copper, cobalt, zinc, and chromium.

3. A set of inkjet inks for inkjet printing, comprising a light magenta ink comprising a high lightfastness magenta dye, the ink set further comprising a dark magenta ink comprising a high chroma magenta dye, wherein the high lightfastness magenta dye is Reactive Red 23, having a structure

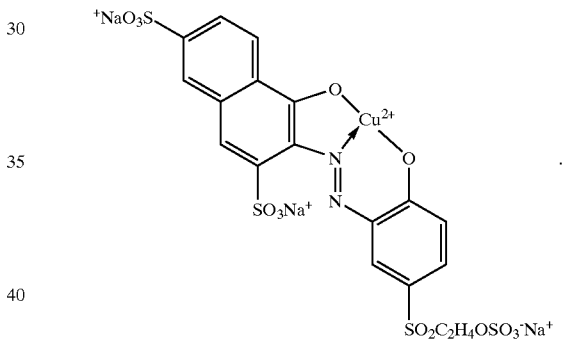

4. A set of inkjet inks for inkjet printing, comprising a light magenta ink comprising a high lightfastness magenta dye, the ink set further comprising a dark magenta ink comprising a high chroma magenta dye, wherein the high lightfastness magenta dye has a structure

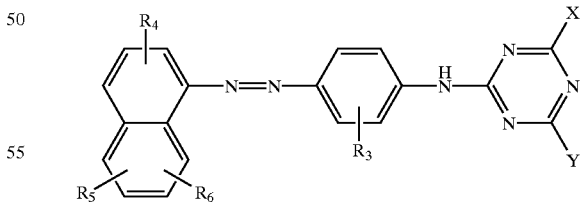

wherein X, Y, R$_3$, R$_4$, R$_5$ and R$_6$ are selected from the group consisting of —OR$_1$, —SO$_2$R$_1$, NR$_1$R$_2$, —SO$_3^-$, and halogen; and wherein R$_1$ and R$_2$ are selected from the group consisting of hydrogen, alkyl, aryl, substituted alkyl, and substituted aryl.

5. A set of inkjet inks for inkjet printing, comprising a light magenta ink comprising a high lightfastness magenta dye, the ink set further comprising a dark magenta ink comprising a high chroma magenta dye, wherein the high lightfastness magenta dye is a 2-(ortho-hydroxy-phenylazo)-1-pyrazolone selected from the group consisting of

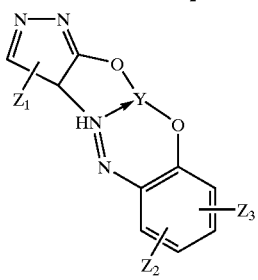

and

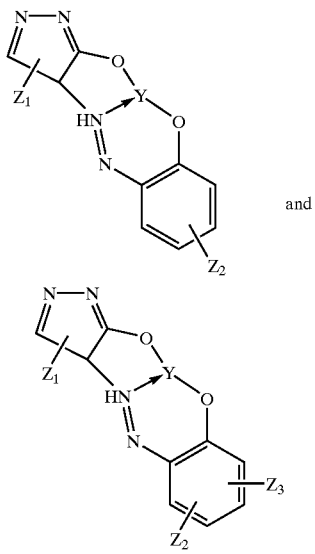

wherein Y is a polyvalent transition metal selected from the group consisting of iron, nickel, copper, cobalt, zinc, and chromium; and $Z_1$, $Z_2$, and $Z_3$ are selected from the group consisting of $-OR_1$, $-SO_2R_1$, $-NR_1R_2$, $-SO_3^-$, and halogen, and wherein $R_1$ and $R_2$ are selected from the group consisting of hydrogen, alkyl, aryl, substituted alkyl, and substituted aryl.

6. A set of inkjet inks for inkjet printing, comprising a light magenta ink comprising a high lightfastness magenta dye, the ink set further comprising a dark magenta ink comprising a high chroma magenta dye, wherein the high lightfastness magenta dye has a structure wherein $R_1$ and $R_2$ are selected from the group consisting of hydrogen, alkyl, aryl,

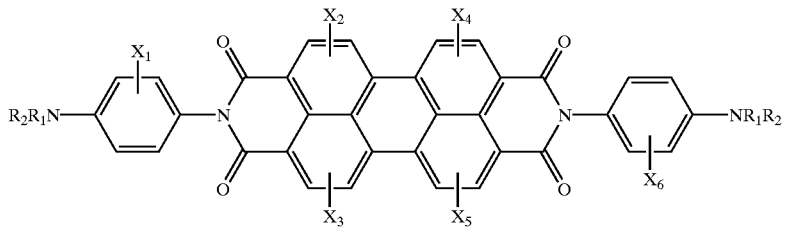

substituted aryl and substituted alkyl;
and wherein $X_1$, $X_2$, $X_3$, $X_4$, $X_5$ and $X_6$ are selected from the group consisting of hydrogen and sulfonate.

7. A set of inklet inks for inkjet printing, comprising:
a light magenta ink comprising a high lightfastness magenta dye, the ink set further comprising a dark magenta ink comprising a high chroma magenta dye, wherein the high lightfastness magenta dye is a 4-hydroxy-3-(2'-pyridylazo)-1-(sulfo substituted) naphthalene magenta dye ligand.

8. The set of inkjet inks according to claim 7, wherein the dye-ligand is selected from the group consisting of 4-hydroxy-3-(2'-pyridylazo)-1-naphthalenesulfonic acid; 4-hydroxy-3-(2'-pyridylazo)-1-naphthalenesulfonamide; N-substituted-4-hydroxy-3-(2'-pyridylazo)-1-naphthalenesulfonamide; N, N'-bis(substituted)4-hydroxy-3-(2'-pyridylazo-1-naphthalenesulfonamide; and mixtures thereof.

9. A set of inkjet inks for inkjet printing, comprising:
a light magenta ink comprising a high lightfastness magenta dye, the ink set further comprising a dark magenta ink comprising a high chroma magenta dye, wherein the high lightfastness magenta dye is a dye ligand coordinated to a polyvalent transition metal selected from the group consisting of iron, nickel, copper, cobalt, zinc, and chromium.

10. A set of inkjet inks for inkjet printing, comprising:
a light magenta ink comprising a high lightfastness magenta dye, the ink set further comprising a dark magenta ink comprising a high chroma magenta dye, wherein the high lightfastness magenta dye is an 8-heterocyclylazo-5-hydroxyquinoline having a structure

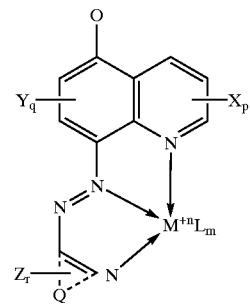

wherein:
M represents a polyvalent transition metal ion selected from the group consisting of iron, nickel, copper, cobalt, zinc, and chromium;
each L independently represents a neutral or anionic ligand;
each X, Y and Z independently represents a substituted or unsubstituted alkyl group of 1–6 carbon atoms, a substituted or unsubstituted aryl group of 6–10 carbon atoms, a substituted or unsubstituted hetaryl group of 5–1 0 atoms, a halogen, a cyano group, a nitro group, a substituted or unsubstituted alkoxycarbonyl group of 1–6 carbon atoms, a substituted or unsubstituted alkoxy group of 1–6 carbon atoms, a hydroxy group, a polyoxyalkylene group of 2–20 alkylene oxide residues, a carboxy group or a salt thereof, a sulfo group or a salt thereof, a phospho group or a salt thereof, a carbamoyl group, a substituted or unsubstituted alkyl-, aralkyl-, aryl-, diaryl- or dialkyl-carbamoyl group of 1–20 carbon atoms, a sulfamoyl group, a substituted or unsubstituted alkyl-, aralkyl-, aryl-, diaryl- or dialkyl-amino group of 1–20 carbon atoms or a quaternary ammonium or phosphonium group;

Q represents the atoms necessary to complete a 5- or 6-membered heterocyclic ring;

n represents 2 or 3;

m represents an integer from 1–3;

each p and r independently represents an integer from 0–3;

q represents 0, 1 or 2;

two or more of L are joined together to form a bi- or tridentate ligand which may optionally comprise another polydentate molecule of the same or different structure as shown above;

one or more of L are combined with X and/or Z;

one or more of X, Y and Z, together with the carbon to which they are attached, may independently represent a ring nitrogen; and any two of X, Y or Z are joined together to form a 5–7 membered saturated or unsaturated ring.

11. A set of inkjet inks for inkjet printing, comprising:
a light cyan ink comprising a high lightfastness cyan dye, the set of inkjet inks further comprising:
a dark cyan ink comprising a high chroma cyan dye; and wherein the high lightfastness cyan dye of the light cyan ink is not present in a predominant amount in the high chroma cyan dye of the dark cyan ink.

12. The set of inkjet inks for inkjet printing according to claim 11, wherein the high lightfastness cyan dye has a solubility of less than 10% in an aqueous vehicle.

13. The set of inkjet inks for inkjet printing according to claim 11, wherein the high lightfastness cyan dye of the light cyan ink is a different dye than the high chroma cyan dye of the dark cyan ink.

14. The set of inkjet inks for inkjet printing according to claim 11, wherein the high lightfastness cyan dye has a chroma at most 80% of the high chroma cyan dye chroma.

15. The set of inkjet inks according to claim 11, further comprising:
a magenta ink comprising a magenta dye; and
a yellow ink comprising a yellow dye.

16. The set of inkjet inks according to claim 15, wherein each of the magenta, cyan and yellow inks comprises from about 0.1 to about 5 wt % dye.

17. The set of inkjet inks according to claim 15, wherein each of the magenta, cyan and yellow inks comprises from about 2.5 to about 5 wt % dye.

18. The set of inkjet ink according to claim 11, wherein the high lightfastness cyan dye is selected from the group consisting of Direct Blue 199, Direct Blue 86, Acid Blue 45, Acid Blue 138, Acid Blue 251, copper phthalocyanines, nickel phthalocyanines, anthraquinones, disazothiophenes and mixtures thereof.

19. The set of inkjet inks according to claim 18, wherein the anthraquinones are selected from the group consisting of

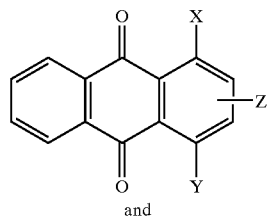
and

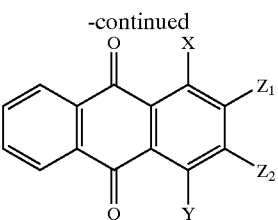

wherein X, Y, Z, $Z_1$ and $Z_2$ are selected from the group consisting of —OH, —NH$_2$, —NHPhenyl, —NHR$_1$, —OPhenyl, —OR$_1$,

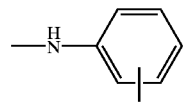
and

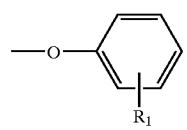

and wherein $R_1$ is an alkyl group having from 1 to 20 carbons.

20. The set of inkjet ink according to claim 11, wherein the high lightfastness cyan dye is a dye ligand coordinated to a polyvalent transition metal selected from the group consisting of iron, nickel, copper, cobalt, zinc, and chromium.

21. The set of inkjet inks according to claim 16, wherein the disazothiophenes have a structure

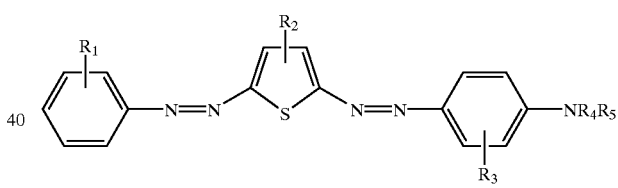

wherein $R_1$, $R_2$, and $R_3$ are selected from the group consisting of —OR, —SO$_2$R$_1$, —NR$_4$R$_5$, —SO$_3^-$ and halogen; and wherein $R_4$ and $R_5$ are selected from the group consisting of hydrogen, alkyl, aryl, substituted alkyl and substituted aryl.

22. A set of inkjet inks for inkjet printing, comprising:
a light yellow ink comprising a high lightfastness yellow dye the set of inkjet inks further comprising:
a dark yellow ink comprising a high chroma yellow dye.

23. The set of inkjet inks for inkjet printing according to claim 22, wherein the high lightfastness yellow dye has a solubility of less than 10% in an aqueous vehicle.

24. The set of inkjet inks for inkjet printing according to claim 22, wherein the high lightfastness yellow dye of the light yellow ink is a different dye than the high chroma yellow dye of the dark yellow ink.

25. The set of inkjet inks for inkjet printing according to claim 24 wherein the high lightfastness yellow dye has a chroma at most 80% of the high chroma yellow dye.

26. The set of inkjet inks according to claim 22, further comprising:
a cyan ink comprising a cyan dye; and
a magenta ink comprising a magenta dye.

27. The set of inkjet inks according to claim 26, wherein each of the magenta, cyan and yellow inks comprises from about 0.1 to about 5 wt % dye.

28. The set of inkjet inks according to claim 26, wherein each of the magenta, cyan and yellow inks comprises from about 2.5 to about 5 wt % dye.

29. The set of inkjet inks according to claim 22, wherein the high lightfastness yellow dye is selected from the group consisting of Yellow 104, Direct Yellow 4, Direct Yellow 86, Direct Yellow 132, Direct Yellow 50, an azo dye, and mixtures thereof.

30. The set of inkjet inks according to claim 22, wherein the high lightfastness yellow dye is a dye ligand coordinated to a polyvalent transition metal selected from the group consisting of iron, nickel, copper, zinc, and chromium.

31. A set of inkjet inks for inkjet printing, comprising:
   a light black ink comprising a high lightfastness black dye, the set of inkjet inks further comprising:
   a dark black ink comprising a high optical density black dye.

32. The set of inkjet inks for inkjet printing according to claim 31, wherein the high lightfastness black dye has a solubility of less than 10% in an aqueous vehicle.

33. The set of inkjet inks for inkjet printing according to claim 32, wherein the high lightfastness black dye of the light black ink is a different dye than the high optical density black dye of the dark black ink.

34. The set of inkjet inks for inkjet printing according to claim 33, wherein the high lightfastness black dye has an optical density at most 80% of the high optical density black dye.

35. The set of inkjet inks according to claim 31, further comprising:
   a magenta ink comprising a magenta dye;
   a cyan ink comprising a cyan dye; and
   a yellow ink comprising a yellow dye.

36. The set of inkjet inks according to claim 35, wherein each of the black, magenta, cyan and yellow inks comprises from about 0.1 to about 5 wt % dye.

37. The set of inkjet inks according to claim 35, wherein each of the black, magenta, cyan, and yellow inks comprises from about 2.5 to about 5 wt % dye.

38. The set of inkjet inks according to claim 31, wherein the high lightfastness black dye is a dye ligand coordinated to a polyvalent transition metal selected from the group consisting of iron, nickel, copper, zinc, and chromium.

39. The set of inkjet inks according to claim 31, wherein the high lightfastness black dye is

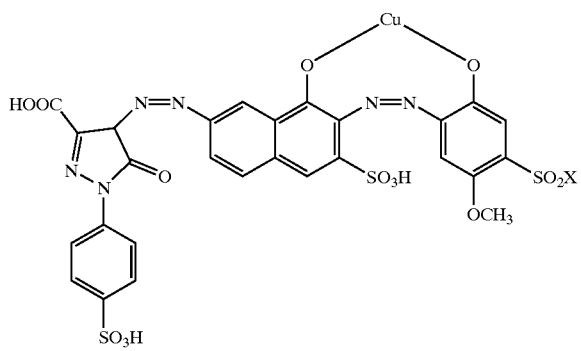

wherein X is selected from the group consisting of —CH=$CH_2$ and —$CH_2$—$CH_2$—O—H.

40. A method for inkjet printing, the method comprising the step of ejecting at least one ink of a set of inks from an inkjet, one of the inks comprising a light magenta ink, the light magenta ink comprising a high lightfastness magenta dye, the ink set further comprising a dark magenta ink comprising a high chroma magenta dye, wherein the high lightfastness magenta dye is selected from the group consisting of

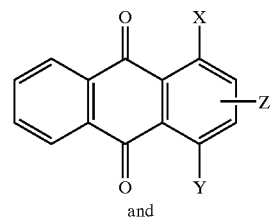

and

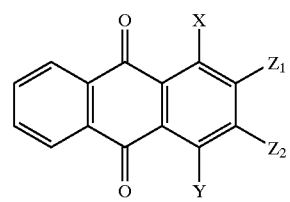

wherein X, Y, Z, $Z_1$ and $Z_2$ are selected from the group consisting of —OH, —$NH_2$, —NHPhenyl, —$NHR_1$, —OPhenyl, —$OR_1$,

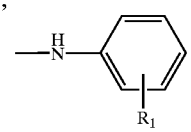

and

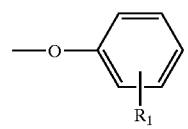

and wherein R1 is an alkyl group having from 1 to 20 carbons.

41. A method of inkjet printing, the method comprising the step of ejecting at least one ink of a set of inks from an inkjet, one of the inks comprising a light magenta ink, the light magenta ink comprising a high lightfastness magenta dye, the ink set further comprising a dark magenta ink comprising a high chroma magenta dye, wherein the high lightfastness magenta dye having a structure

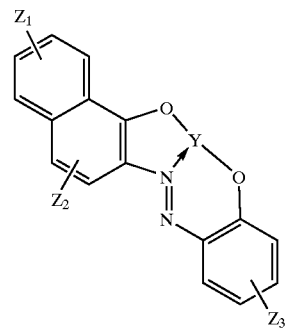

wherein $Z_1$, $Z_2$, and $Z_3$ are selected from the group consisting of —$OR_1$, —$SO_2R_1$, —$NR_1R_2$, —$SO_3^-$, and halogen, and wherein $R_1$ and $R_2$ are selected from the group consisting of hydrogen, alkyl, aryl, substituted alkyl, and substituted aryl; and wherein Y is a polyvalent transition metal selected from the group consisting of iron, nickel, copper, cobalt, zinc, and chromium.

42. A method for inkjet printing, the method comprising the step of ejecting at least one ink of a set of inks from an inkjet, one of the inks comprising a light magenta ink, the light magenta ink comprising a high lightfastness magenta dye, the ink set further comprising a dark magenta ink comprising a high chroma magenta dye, wherein the high lightfastness magenta dye is Reactive Red 23, having a structure

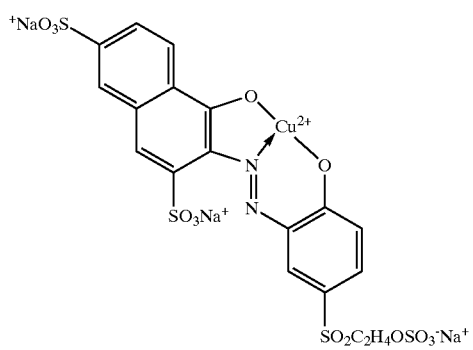

43. A method for inkjet printing, the method comprising the step of ejecting at least one ink of a set of inks from an inkjet, one of the inks comprising a light magenta ink, the light magenta ink comprising a high lightfastness magenta dye, the ink set further comprising a dark magenta ink comprising a high chroma magenta dye, wherein the high lightfastness magenta dye has a structure

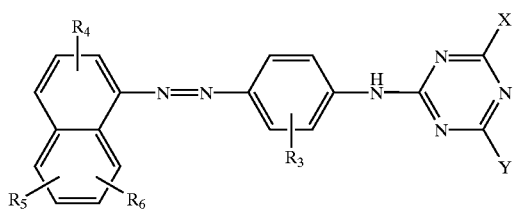

wherein X, Y, $R_3$, $R_4$, $R_5$ and $R_6$ are selected from the group consisting of —$OR_1$, —$SO_2R_1$, —$NR_1R_2$, —$SO_3^-$, and halogen; and wherein $R_1$ and $R_2$ are selected from the group consisting of hydrogen, alkyl, aryl, substituted alkyl, and substituted aryl.

44. A method for inkjet printing, the method comprising the step of ejecting at least one ink of a set of inks from an inkjet, one of the inks comprising a light magenta ink, the light magenta ink comprising a high lightfastness magenta dye, the ink set further comprising a dark magenta ink comprising a high chroma magenta dye, wherein 2-(ortho-hydroxy-phenylazo)-1-pyrazolone selected from the group consisting of

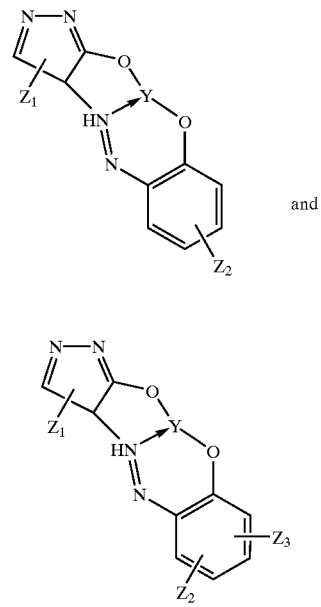

and wherein Y is a Polyvalent transition metal selected from the group consisting of iron, nickel, copper, cobalt, zinc, and chromium; and $Z_1$, $Z_2$, and $Z_3$ are selected from the group consisting of —$OR_1$, —$SO_2R_1$, —$NR_1R_2$, —$SO_3^-$, and halogen, and $R_1$ and $R_2$ are selected from the group consisting of hydrogen, alkyl, aryl, substituted alkyl, and substituted aryl.

45. A method for inkjet printing, the method comprising the step of ejecting at least one ink of a set of inks from an inkjet, one of the inks comprising a light magenta ink, the light magenta ink comprising a high lightfastness magenta dye, the ink set further comprising a dark magenta ink comprising a high chroma magenta dye, wherein the high lightfastness magenta dye has a structure

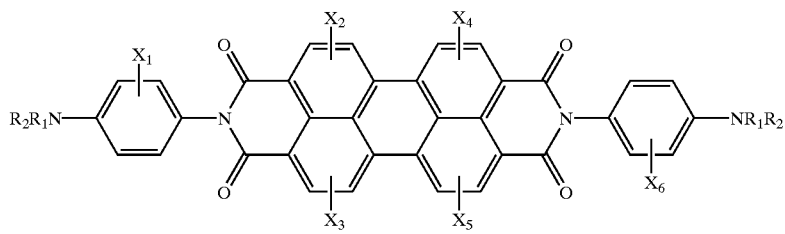

wherein $R_1$ and $R_2$ are selected from the group consisting of hydrogen, alkyl, aryl, substituted aryl and substituted alkyl; and wherein $X_1$, $X_2$, $X_3$, $X_4$, $X_5$ and $X_6$ are selected from the group consisting of hydrogen and sulfonate.

46. A method for inkjet printing, the method comprising the step of ejecting at least one ink of a set of inks from an inkjet, one of the inks comprising a light magenta ink, the light magenta ink comprising a high lightfastness magenta dye, wherein the high lightfastness magenta dye is a 4-hydroxy-3-(2'-pyridylazo)-1-(sulfo substituted) naphthalene magenta dye ligand.

47. The method according to claim 46, wherein the dye-ligand is selected from the group consisting of 4-hydroxy-3-(2'-pyridylazo)-1-naphthalenesulfonic acid; 4-hydroxy-3-(2'-pyridylazo)-1-naphthalenesulfonamide; N-substituted4-hydroxy-3-(2'-pyridylazo)-1-naphthalenesulfonamide; N,N'-bis(substituted)-4-hydroxy-3-(2'-pyridylazo-1-naphthalenesulfonamide; and mixtures thereof.

48. A method for inkjet printing, the method comprising the step of ejecting at least one ink of a set of inks from an inkjet, one of the inks comprising a light magenta ink, the light magenta ink comprising a high lightfastness magenta dye, the ink set further comprising a dark magenta ink comprising a high chroma magenta dye, wherein the high lightfastness magenta dye is a dye ligand coordinated to a polyvalent transition metal selected from the group consisting of iron, nickel, copper, cobalt, zinc, and chromium.

49. A method for inkjet printing, the method comprising the step of ejecting at least one ink of a set of inks from an inkjet, one of the inks comprising a light magenta ink, the light magenta ink comprising a high lightfastness magenta dye, the ink set further comprising a dark magenta ink comprising a high chroma magenta dye, wherein the high lightfastness magenta dye is an 8-heterocyclylazo-5-hydroxyquinoline having a structure

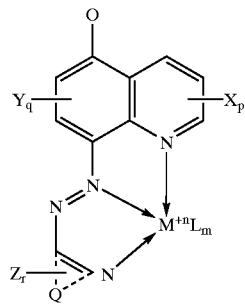

wherein:
M represents a polyvalent transition metal ion selected from the group consisting of iron, nickel, copper, cobalt, zinc, and chromium;

each L independently represents a neutral or anionic ligand;

each X, Y and Z independently represents a substituted or unsubstituted alkyl group of 1–6 carbon atoms, a substituted or unsubstituted aryl group of 6–10 carbon atoms, a substituted or unsubstituted hetaryl group of 5–10 atoms, a halogen, a cyano group, a nitro group, a substituted or unsubstituted alkoxycarbonyl group of 1–6 carbon atoms, a substituted or unsubstituted alkoxy group of 1–6 carbon atoms, a hydroxy group, a polyoxyalkylene group of 2–20 alkylene oxide residues, a carboxy group or a salt thereof, a sulfo group or a salt thereof, a phospho group or a salt thereof, a carbamoyl group, a substituted or unsubstituted alkyl-, aralkyl-, aryl-, diaryl- or dialkyl-carbamoyl group of 1–20 carbon atoms, sulfamoyl group, a substituted or unsubstituted alkyl-, aralkyl-, aryl-, diaryl- or dialkyl-amino group of 1–20 carbon atoms or a quaternary ammonium or phosphonium group;

Q represents the atoms necessary to complete a 5- or 6-membered heterocyclic ring;

n represents 2 or 3;

m represents an integer from 1–3;

each p and r independently represents an integer from 0–3;

q represents 0, 1 or 2;

two or more of L are joined together to form a bi- or tridentate ligand which may optionally comprise another polydentate molecule of the same or different structure as shown above;

one or more of L are combined with X and/or Z;

one or more of X, Y and Z, together with the carbon to which they are attached, may independently represent a ring nitrogen; and any two of X, Y or Z are joined together to form a 5–7 membered saturated or unsaturated ring.

50. A method for inkjet printing, the method comprising the step of ejecting at least one ink of a set of inks from an inkjet, one of the inks comprising a light cyan ink, the light cyan ink comprising a high lightfastness cyan dye, and the set of inks further comprising:

a dark cyan ink comprising a high chroma cyan dye, wherein the high lightfastness cyan dye of the light cyan ink is not present in a predominant amount in the high chroma cyan dye of the dark cyan ink.

51. The method for inkjet printing according to claim 50, wherein the high lightfastness cyan dye has a solubility of less than 10% in an aqueous vehicle.

52. The method for inkjet printing according to claim 50, wherein the high lightfastness cyan dye of the light cyan ink is a different dye than the high chroma cyan dye of the dark cyan ink.

53. The method of inkjet printing according to claim 50, wherein the high lightfastness cyan dye has a chroma at most 80% of the high chroma cyan dye.

54. The method according to claim 50, further comprising:
a magenta ink comprising a magenta dye; and
a yellow ink comprising a yellow dye.

55. The method according to claim 54, wherein each of the magenta, cyan and yellow inks comprises from about 0.1 to about 5 wt % dye.

56. The method according to claim 54, wherein each of the magenta, cyan and yellow inks comprises from about 2.5 to about 5 wt % dye.

57. The method according to claim 50, wherein the high lightfastness cyan dye is selected from the group consisting of Direct Blue 199, Direct Blue 86, Acid Blue 45, Acid Blue 138, Acid Blue 251, copper phthalocyanines, nickel phthalocyanines, anthraquinones, disazothiophenes and mixtures thereof.

58. The method of inkjet printing according to claim 57, wherein the anthraquinones are selected from the group consisting of

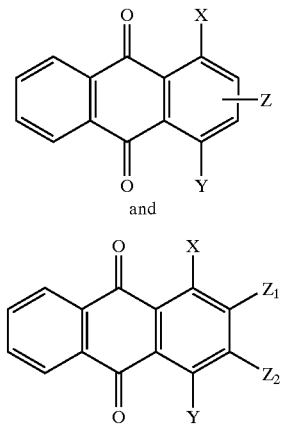

wherein X, Y, Z, $Z_1$ and $Z_2$ are selected from the group consisting of —OH, —NH$_2$, —NHPhenyl, —NHR$_1$, —OPhenyl, —OR$_1$,

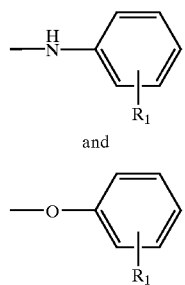

and wherein R$_1$ is an alkyl group having from 1 to 20 carbons.

59. The method according to claim 50, wherein the high lightfastness cyan dye is a dye ligand coordinated to a polyvalent transition metal selected from the group consisting of iron, nickel, copper, cobalt, zinc, and chromium.

60. The method of inkjet printing according to claim 59, wherein the disazothiophenes have a structure

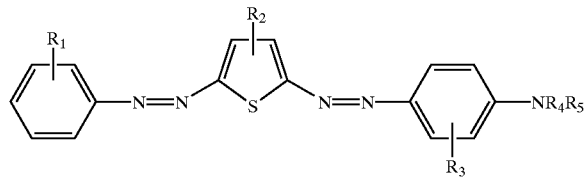

wherein $R_1$, $R_2$, and $R_3$ are selected from the group consisting of —OR, —SO$_2$R$_1$, —NR$_4$R$_5$, —SO$_3^-$ and halogen; and wherein $R_4$ and $R_5$, are selected from the group consisting of hydrogen, alkyl, aryl, substituted alkyl and substituted aryl.

61. A method for inkjet printing, the method comprising the step of ejecting at least one of a set of inks from an inkjet, one of the inks comprising a light yellow ink, the light yellow ink comprising a high lightfastness yellow dye, and the set of inks further comprising:
a dark yellow ink comprising at least one high chroma yellow dye.

62. The method for inkjet printing according to claim 61, wherein the high lightfastness yellow dye has a solubility of less than 10% in an aqueous vehicle.

63. The method of inkjet printing according to claim 61, wherein the high lightfastness yellow dye of the light yellow ink is a different dye than the high chroma yellow dye of the dark yellow ink.

64. The method of inkjet printing according to claim 63, wherein the high lightfastness yellow dye has a chroma at most 80% of the high chroma yellow dye chroma.

65. The method according to claim 61, further comprising:
a cyan ink comprising a cyan dye; and
a magenta ink comprising a magenta dye.

66. The method according to claim 65, wherein each of the magenta, cyan and yellow inks comprises from about 0.1 to about 5 wt % dye.

67. The method according to claim 66, wherein each of the magenta, cyan and yellow inks comprises from about 2.5 to about 5 wt % dye.

68. The method according to claim 61, wherein the high lightfastness yellow dye is selected from the group consisting of Yellow 104, Direct Yellow 4, Direct Yellow 86, Direct Yellow 132, Direct Yellow 50, an azo dye, and mixtures thereof.

69. The method according to claim 61, wherein the high lightfastness yellow dye is a dye ligand coordinated to a polyvalent transition metal selected from the group consisting of iron, nickel, copper, cobalt, zinc and chromium.

70. A method for inkjet printing, the method comprising the step of ejecting at least one of a set of inks from an inkjet, one of the inks comprising a light black ink, the light black ink comprising a high lightfastness black dye, and the set of inks further comprising:
a dark black ink comprising a high optical density black dye.

71. The method for inkjet printing according to claim 70, wherein the high lightfastness black dye has a solubility of less than 10% in an aqueous vehicle.

72. The method for inkjet printing according to claim 70, wherein the high lightfastness black dye of the light black ink is a different dye than the high optical density black dye of the dark black ink.

73. The method of inkjet printing according to claim 70, wherein the high lightfastness black dye has an optical density at most 80% of the high optical density black dye.

74. The method according to claim 70 further comprising:
a magenta ink comprising a magenta dye;
a cyan ink comprising a cyan dye; and
a yellow ink comprising a yellow dye.

75. The method according to claim 74, wherein each of the black, magenta, cyan and yellow inks comprises from about 0.1 to about 5 wt % dye.

76. The method according to claim 74, wherein each of the black, magenta, cyan and yellow inks comprises from about 2.5 to about 5 wt % dye.

77. The method of inkjet printing according to claim 70, wherein the high lightfastness black dye is a dye ligand coordinated to a polyvalent transition metal selected from the group consisting of iron, nickel, copper, zinc, and chromium.

78. The method according to claim 70, wherein the high lightfastness black dye is

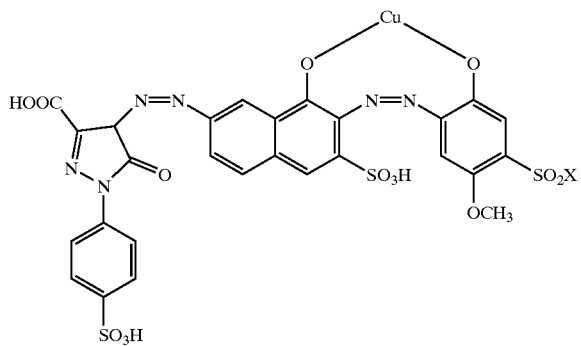

wherein X is selected from the group consisting of —CH=CH$_2$ and —CH$_2$—CH$_2$—O—H.

79. A set of inkjet ink for inkjet printing, comprising a light magenta ink comprising a high lightfastness magenta dye, the ink set further comprising a dark magenta ink comprising a high chroma magenta dye, wherein the high lightfastness magenta dye has a solubility of less than 10% in an aqueous vehicle.

80. A method for inkjet printing, the method comprising the step of ejecting at least one ink of a set of inks from an inkjet, one of the inks comprising a light magenta ink, the light magenta ink comprising a high lightfastness magenta dye, the ink set further comprising a dark magenta ink comprising a high chroma magenta dye, wherein the high lightfastness magenta dye has a solubility of less than 10% in an aqueous vehicle.

* * * * *

UNITED STATES PATENT AND TRADEMARK OFFICE
CERTIFICATE OF CORRECTION

PATENT NO. : 6,521,030 B1
DATED : February 18, 2003
INVENTOR(S) : Stoffel

It is certified that error appears in the above-identified patent and that said Letters Patent is hereby corrected as shown below:

<u>Title page,</u>
Item [54], delete "LIGTHFASTNESS" and insert therefor -- LIGHTFASTNESS --.

<u>Column 14,</u>
Line 55, delete "5-1 0" and insert therefor -- 5-10 --.

<u>Column 20,</u>
Line 35, delete "Polyvalent" and insert therefor -- polyvalent --.

Signed and Sealed this

Third Day of February, 2004

JON W. DUDAS
*Acting Director of the United States Patent and Trademark Office*